United States Patent
Choi et al.

(10) Patent No.: US 10,273,837 B1
(45) Date of Patent: Apr. 30, 2019

(54) SYSTEM FOR CONTROLLING VARIABLE VALVE APPARATUS AND OIL CONTROL VALVE FOR THE SAME

(71) Applicants: Hyundai Motor Company, Seoul (KR); Kia Motors Corporation, Seoul (KR)

(72) Inventors: Myung-Sik Choi, Seoul (KR); Young-Hong Kwak, Suwan-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 15/837,738

(22) Filed: Dec. 11, 2017

(30) Foreign Application Priority Data

Nov. 20, 2017 (KR) .................. 10-2017-0154805

(51) Int. Cl.
*F01L 1/344* (2006.01)
*F15B 13/02* (2006.01)

(52) U.S. Cl.
CPC .......... *F01L 1/3442* (2013.01); *F15B 13/024* (2013.01); *F01L 2001/3443* (2013.01); *F01L 2001/34446* (2013.01); *F15B 2211/40592* (2013.01)

(58) Field of Classification Search
CPC ..... F01L 2001/3443; F01L 2001/34446; F01L 1/46

USPC ............................................ 123/90.12, 90.15
See application file for complete search history.

(56) References Cited

U.S. PATENT DOCUMENTS

| 7,134,408 B2 | 11/2006 | Diehl et al. |
| 7,162,982 B2 | 1/2007 | Rabhi |
| 2008/0035085 A1 | 2/2008 | Hendriksma |
| 2010/0313834 A1* | 12/2010 | Auchter ............... F01L 1/34 123/90.15 |
| 2016/0017774 A1* | 1/2016 | Zurface ............... F01L 1/26 123/90.12 |
| 2016/0290184 A1 | 10/2016 | Yeager et al. |

FOREIGN PATENT DOCUMENTS

| KR | 10-1080777 B1 | 3/2007 |
| KR | 10-0737005 B1 | 6/2007 |
| KR | 10-0836927 B1 | 6/2008 |
| KR | 10-1601132 B1 | 12/2015 |

* cited by examiner

*Primary Examiner* — Jorge L Leon, Jr.
(74) *Attorney, Agent, or Firm* — Morgan, Lewis & Bockius LLP

(57) ABSTRACT

A system for controlling a variable valve apparatus may include a plurality of oil control valves (OCVs) configured to respectively supply oil from an oil pump to a plurality of variable valve apparatuses or block the supply of the oil, and a single relief valve coupled to the plurality of oil control valves, wherein pressure in a plurality of control galleries for providing an oil supply path from the plurality of oil control valves to the plurality of variable valve apparatuses is maintained constant by only the single relief valve.

17 Claims, 11 Drawing Sheets

SYSTEM FOR CONTROLLING VARIABLE VALVE APPARATUS AND OIL CONTROL VALVE FOR THE SAME

CROSS-REFERENCE(S) TO RELATED APPLICATIONS

The present application claims priority to Korean Patent Application No. 10-2017-0154805, filed on Nov. 20, 2017, the entire contents of which is incorporated herein for all purposes by this reference.

BACKGROUND OF THE INVENTION

Field of the Invention

The present invention relates to a system for controlling a variable valve apparatus which is controlled by hydraulic pressure, and an oil control valve for the system.

Description of Related Art

Improvement in performance and fuel efficiency of vehicles is one of major objectives in developing the vehicles. To achieve this purpose, it may be essential to use a variable valve system for embodying the optimum valve mode corresponding to a driving region.

A variable valve control system is a system, which is disposed on intake and exhaust camshafts of an engine and operated by hydraulic pressure, and in which an oil control valve (OCV) transmits or interrupts hydraulic pressure supplied from an oil pump in a response to an ECU signal so that the rotating angle, the lift or the valve timing of a camshaft relative to rotation of a crank shaft are changed, thus making it possible to reduce exhaust gas, enhance the output, and improve the fuel efficiency.

As a variable valve apparatus for achieving the above purpose, a two-stage variable valve apparatus or a three-stage variable valve apparatus for selectively embodying a valve lift is used. For example, referring to FIG. 1, an Atkinson or Miller VVL mode is advantageous for improving the fuel efficiency in medium and high load regions of an engine, and a CDA mode is advantageous for improving the fuel efficiency in a low load region. Furthermore, in a coasting operation region, an entire-cylinder CDA mode is advantageous.

Accordingly, the optimum valve mode suitable for each driving region may be embodied to enhance the fuel efficiency and torque. However, when a half-cylinder CDA mode, the entire-cylinder CDA mode, or the VVL mode is applied to the engine, the number of parts is increased, thus causing a problem of difficulty in packaging and a problem of an increase in the production cost.

The OCV is also one of added parts in such a case.

FIG. 2 is a diagram schematically illustrating an oil circuit of a system for controlling a variable valve apparatus. FIG. 3 is a diagram schematically illustrating an OCV and an oil line.

Referring to FIG. 2 and FIG. 3, a main gallery 1 is an oil line which is directly coupled from an oil pump to a block or a head. A control gallery 2 is an oil line that couples an outlet of the OCV with a latching pin of the variable valve apparatus. With regard to a drain hole 3, when the pressure of oil in the control gallery 2 is greater than a spring force of a relief valve 4, the relief valve 4 opens so that oil is drained through the drain hole 3.

The OCV is disposed between the main gallery 1 and the control gallery 2. If electricity is applied to a solenoid 5 when the OCV is turned on, a pintle 6 pushes a check ball 7 to open a flow passage of the main gallery 1 and the control gallery 2 and, simultaneously, brings the relief valve 4 into close contact with a relief valve seat 8 to block the flow passage between the control gallery 2 and the drain hole 3, thus preventing oil in the control gallery 2 from leaking.

When the OCV is turned off, the pintle 6 returns to its original position, and the check ball 7 moves upward so that the flow passage of the main gallery 1 and the controller gallery 2 is blocked.

Simultaneously, the pintle 6 which is disposed over the relief valve 4 to hold and control the relief valve 4 is lifted, and a clearance is present. Thus, in the instant case, the spring of the relief valve 4 limits the movement of the relief valve 4.

An orifice 9 is disposed between the main gallery 1 and the control gallery 2, and is configured to supply oil so that the control gallery 2 can be always filled with oil.

The relief valve 4 functions to maintain the pressure difference between the control gallery 2 and a drain line connected to the drain hole 3 constant when the OCV is turned off.

When the pressure difference is greater than the mounting load of a relief spring, the relief valve opens, and when it is less than the mounting load, the relief valve is closed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for controlling a variable valve apparatus and an oil control valve (OCV) for the system, which is configured for reducing a reduced number of parts of the OCV and an oil circuit, so that even if different types of variable valve apparatuses are applied to a single engine, a problem of difficulty in packaging and a problem of an increase in the production cost can be solved.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided a system for controlling a variable valve apparatus, including: a plurality of oil control valves (OCVs) configured to respectively supply oil from an oil pump to a plurality of variable valve apparatuses or block the supply of the oil; and a single relief valve coupled to the plurality of oil control valves, wherein pressure in a plurality of control galleries for providing an oil supply path from the plurality of oil control valves to the plurality of variable valve apparatuses is maintained constant by only the single relief valve.

In an exemplary embodiment of the present invention, the plurality of oil control valves may be coupled with the single relief valve through a pressure control line, and when the supply of oil to the plurality of variable valve apparatuses is blocked, the plurality of control galleries may be coupled with the pressure control line.

In an exemplary embodiment of the present invention, a drain hole suitable for draining oil may be formed in the single relief valve so that the pressure in the control galleries is reduced by draining oil from the control galleries through the drain hole, whereby a difference in pressure between the control galleries and the drain hole remains constant.

In an exemplary embodiment of the present invention, when a difference between pressure of the oil in the control galleries and pressure of the drain hole is greater than a spring force of the relief valve, the relief valve may open so that oil is drained through the drain hole.

In an exemplary embodiment of the present invention, when a flow passage of the control galleries to the variable valve apparatuses is opened by solenoid control, a flow passage from the plurality of oil control valves to the pressure control line may be blocked.

In an exemplary embodiment of the present invention, when the supply of oil from the oil pump to the oil control valves is blocked by solenoid control, the flow passage of the control galleries to the variable valve apparatuses may be blocked.

In an exemplary embodiment of the present invention, the variable valve apparatuses may include a 2-stage variable valve apparatus or a 3-stage variable valve apparatus.

In an exemplary embodiment of the present invention, the system may further include a single orifice provided on a return line coupling the pressure control line with a main gallery suitable for providing a path of oil to be supplied from the oil pump to the plurality of oil control valves, so that the plurality of control galleries remain filled with oil by only the single orifice.

In accordance with various exemplary embodiments of the present invention, there is provided a system for controlling a variable valve apparatus, including: a plurality of oil control valves (OCVs) configured to respectively supply oil supplied from an oil pump through a main gallery, to a plurality of variable valve apparatuses through a plurality of control galleries, or block the supply of the oil; and a pressure control line coupled with the plurality of oil control valves and configured to control pressure in the control galleries; and a single orifice provided on a return line coupling the main gallery with the pressure control line, so that the plurality of control galleries remain filled with oil by only the single orifice.

In an exemplary embodiment of the present invention, when the supply of the oil to the plurality of variable valve apparatuses is blocked by the oil control valve, the plurality of control galleries may be coupled with the pressure control line.

In an exemplary embodiment of the present invention, the pressure in the control galleries may be reduced by draining oil from the control galleries through the pressure control line.

In an exemplary embodiment of the present invention, when a flow passage of the control galleries to the variable valve apparatuses is opened by solenoid control, a flow passage from the plurality of oil control valves to the pressure control line may be blocked.

In an exemplary embodiment of the present invention, when the main gallery may be blocked by solenoid control, the flow passage of the control galleries to the variable valve apparatuses is blocked.

In an exemplary embodiment of the present invention, the variable valve apparatuses may include a 2-stage variable valve apparatus or a 3-stage variable valve apparatus.

In accordance with various exemplary embodiments of the present invention, there is provided an oil control valve configured to supply oil from an oil pump to a variable valve apparatus through a control gallery or block the supply of the oil, wherein pressure of oil in the control gallery is controlled through a pressure control line coupled with a relief valve separately provided rather than being provided as an internal element.

In an exemplary embodiment of the present invention, when a pintle operates a check ball by a solenoid to block a flow passage of the control gallery to the variable valve apparatus, a hole coupled to the pressure control line may open so that the check ball is disposed at a position at which a flow passage between the control gallery and the pressure control line opens.

In an exemplary embodiment of the present invention, when the flow passage between the control gallery and the pressure control line opens, oil in the control gallery may be drained through the pressure control line so that the pressure of the oil in the control gallery is reduced.

In an exemplary embodiment of the present invention, when a difference in pressure between the control gallery and the pressure control line may be a predetermined value or more, the oil in the control gallery may be drained through the pressure control line.

In an exemplary embodiment of the present invention, when the pintle operates the check ball by the solenoid to open the flow passage of the control gallery to the variable valve apparatus, the check ball may be disposed at a position at which the check ball closes the hole coupled to the pressure control line so that the flow passage to the pressure control line is blocked.

In an exemplary embodiment of the present invention, when the pintle operates the check ball by the solenoid and thus the supply of the oil from the oil pump is blocked, the check ball may be disposed at a position at which the flow passage of the control gallery to the variable valve apparatus is blocked.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
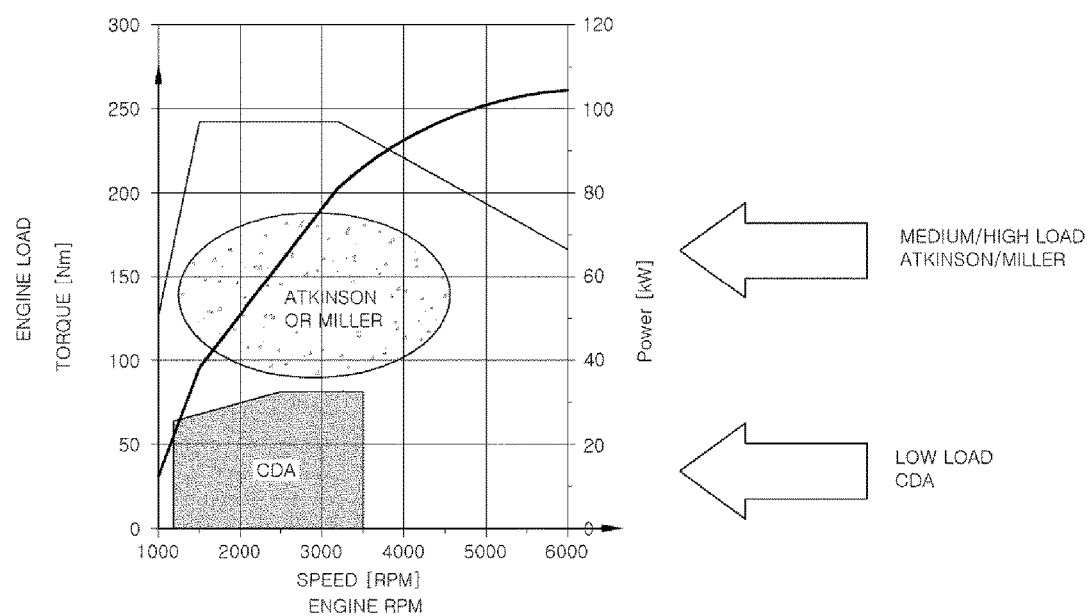
FIG. 1 is a view illustrating a proper load region according to a variable valve apparatus.
Figure 2:
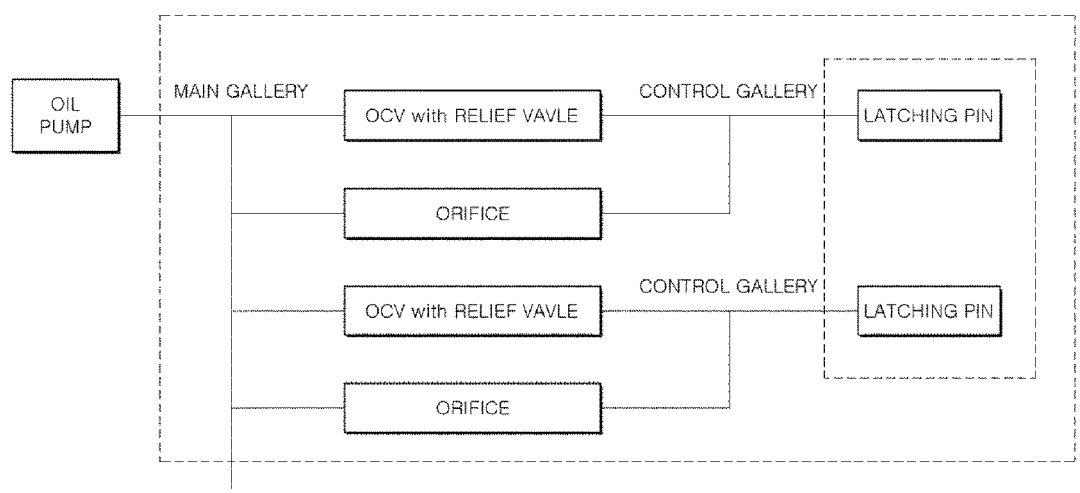
FIG. 2 is a diagram schematically illustrating an oil circuit of a conventional system for controlling a variable valve apparatus.
Figure 3:
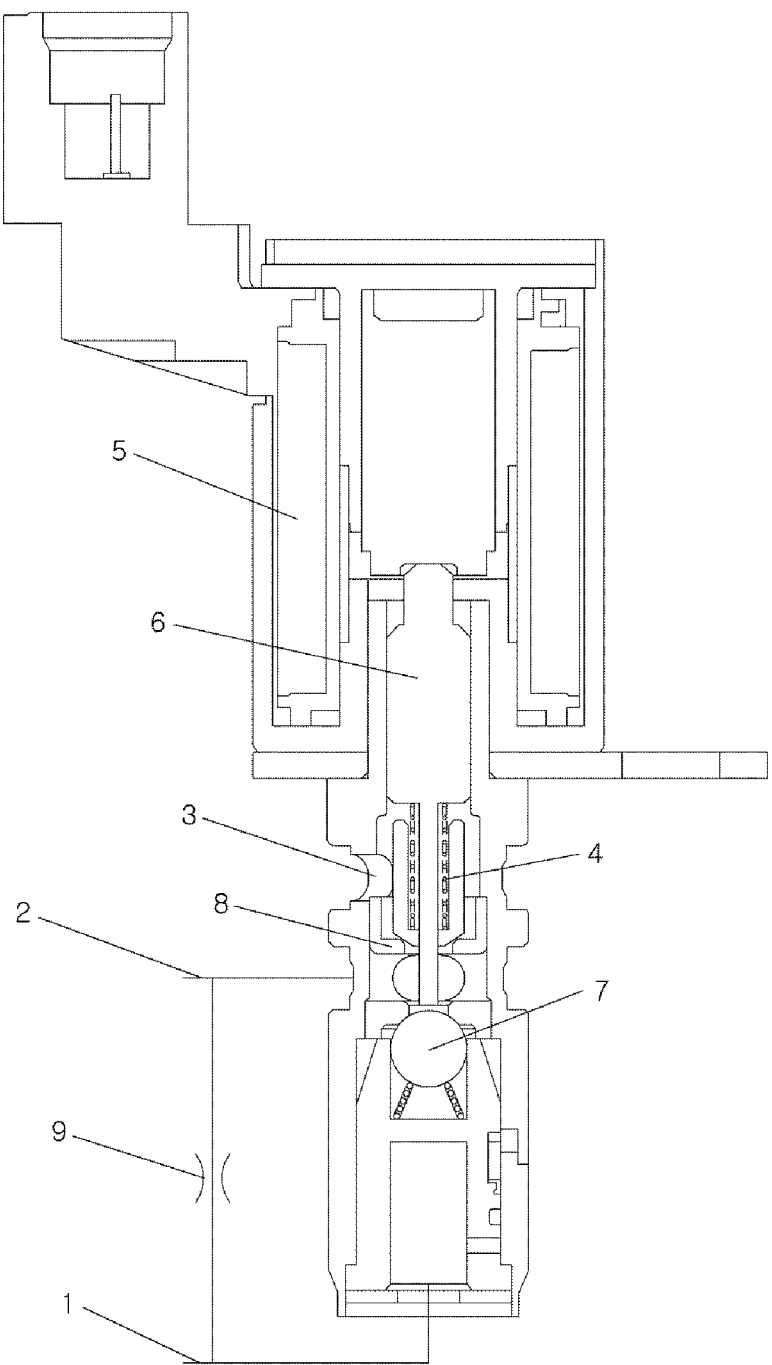
FIG. 3 is a diagram schematically illustrating an oil control valve (OCV) of the conventional system for controlling the variable valve apparatus.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

If in the specification, detailed descriptions of well-known functions or configurations would unnecessarily obfuscate the gist of the present invention, the detailed descriptions will be shortened or omitted.

Figure 4:
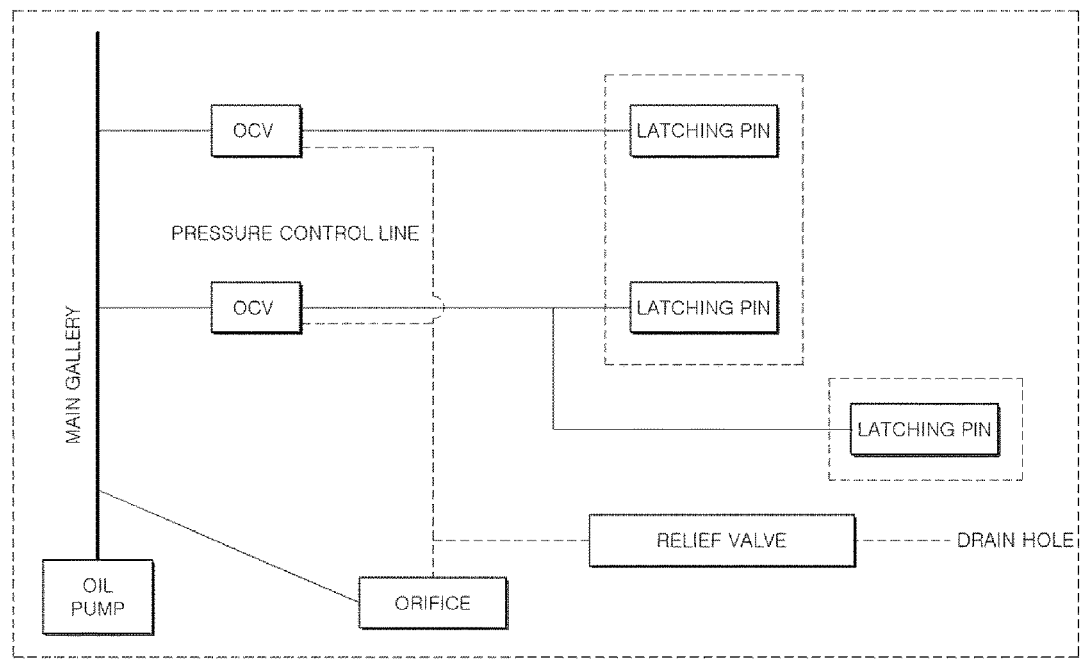
FIG. 4 is a diagram schematically illustrating an example of an oil circuit of a system for controlling a variable valve apparatus according to an exemplary embodiment of the present invention.
Figure 5:
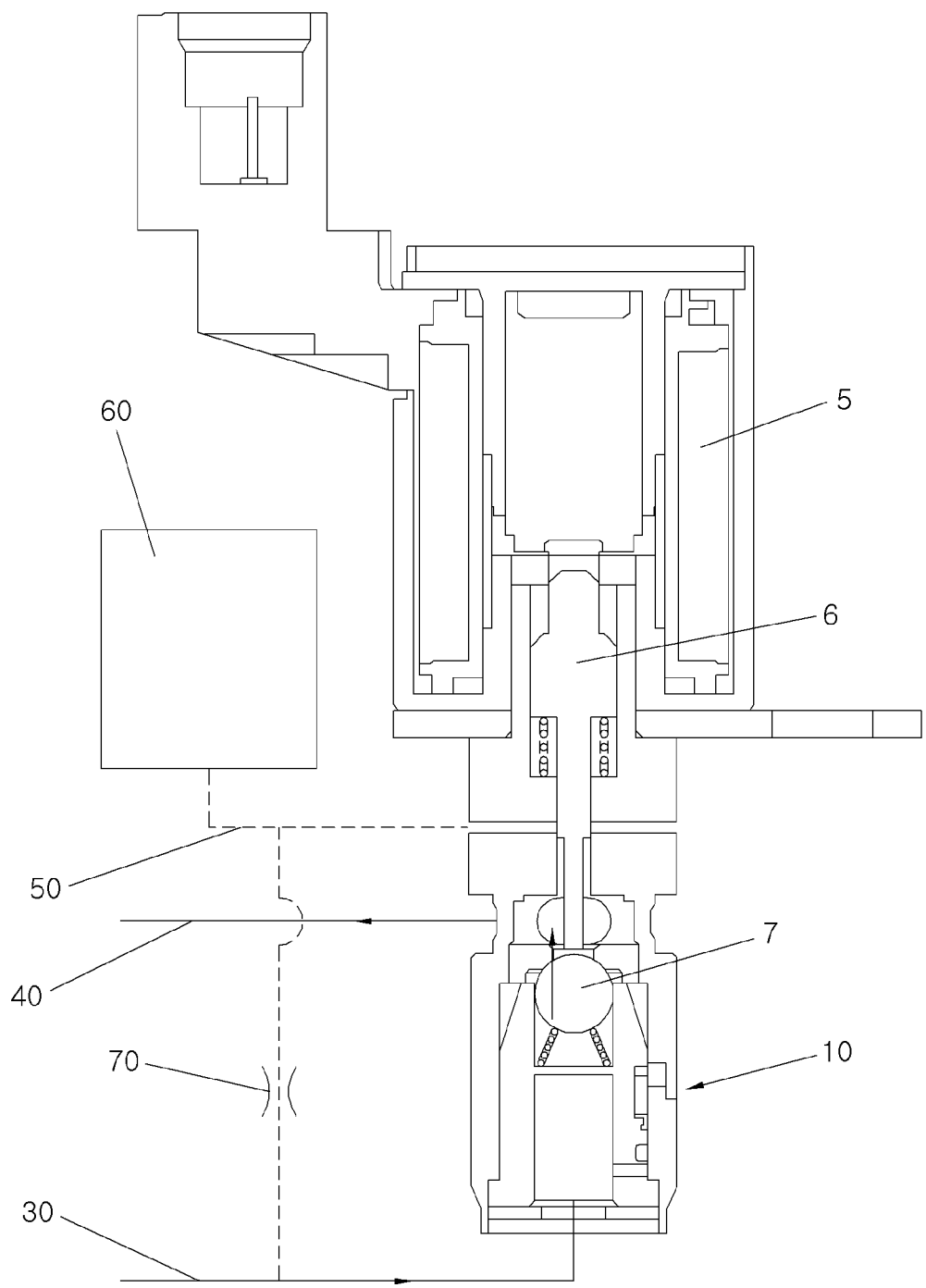
FIG. 5 and FIG. 6 are diagrams schematically illustrating an example of the operation of an OCV of the system for controlling the variable valve apparatus according to an exemplary embodiment of the present invention.
Figure 6:
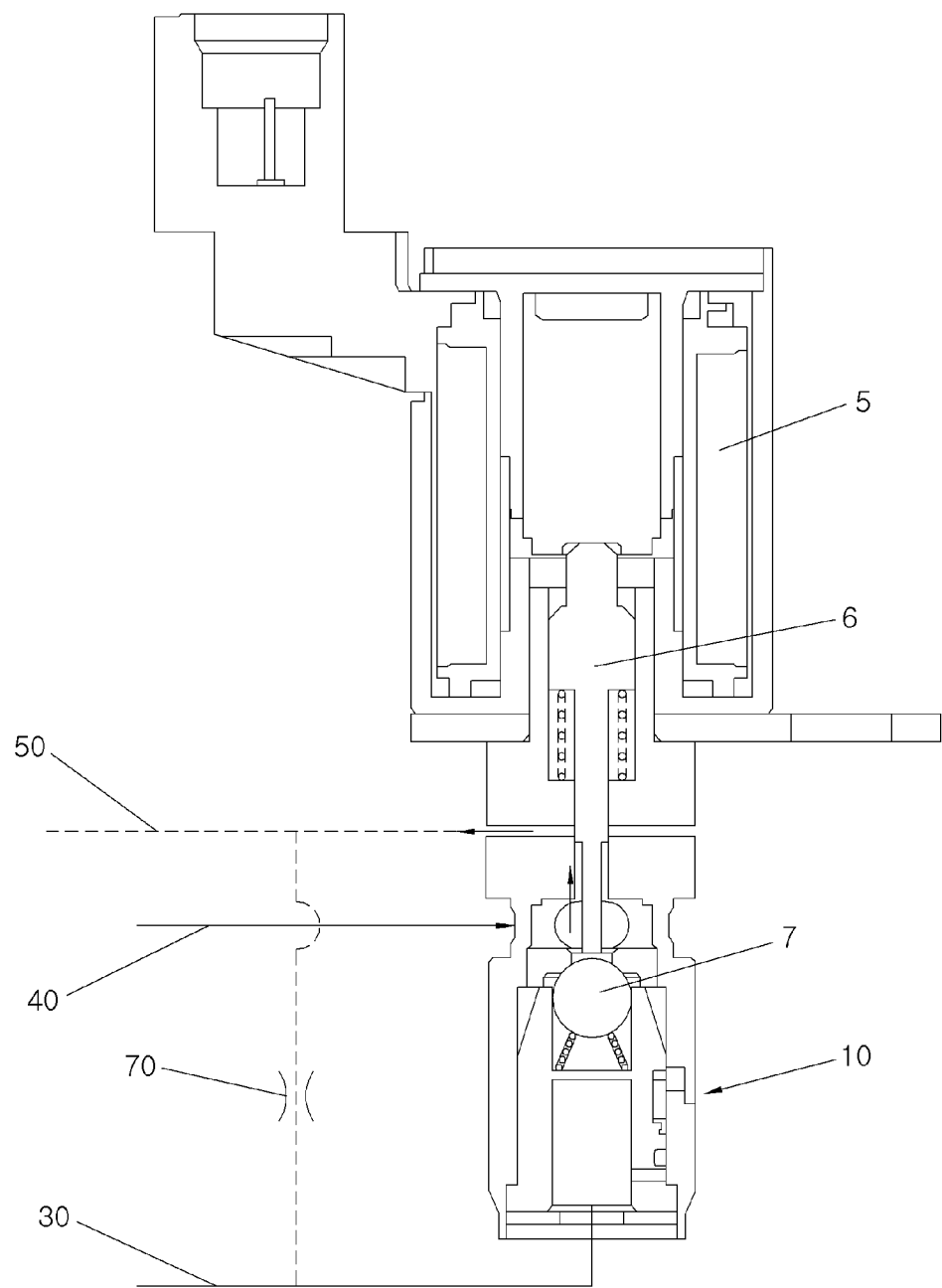

FIG. 4 is a diagram schematically illustrating an example of an oil circuit of a system for controlling a variable valve apparatus according to an exemplary embodiment of the present invention. FIG. 5 and FIG. 6 are diagrams schematically illustrating an example of the operation of an oil control valve (OCV) of the system for controlling the variable valve apparatus according to an exemplary embodiment of the present invention.

Hereinafter, a system for controlling a variable valve apparatus and an oil control valve for the system according to an exemplary embodiment of the present invention will be described with reference to FIG. 4, FIG. 5 and FIG. 6.

The system for controlling the variable valve apparatus according to an exemplary embodiment of the present invention controls the variable valve apparatus using hydraulic pressure, thus making it possible for the variable valve apparatus to efficiently control intake and exhaust air of an engine.

To achieve the above-mentioned purpose, oil supplied from an oil pump is supplied to the variable valve apparatus through an oil circuit, and the supply and interruption of oil are performed by the OCV in a solenoid control manner.

FIG. 4 illustrates an oil circuit formed when a two- or three-stage variable valve apparatus is applied to the engine. As shown in the drawing, in an exemplary embodiment of the present invention, a relief valve and an orifice are integrally formed through a pressure control line rather than being separately provided on each OCV.

Hence, even when a plurality of variable valve apparatuses are used in a single engine, the number of required parts can be minimized.

The OCV will be described with reference to FIGS. 4, 5, and 6. A main gallery 30 is an oil line that directly couples the oil pump to a block or a head. A control gallery 40 is an oil line that couples an outlet of the OCV to a latching pin of the variable valve apparatus.

Unlike the conventional structure in which drain holes are provided for respective OCVs, the present invention is configured such that OCVs are integrally coupled to each other through a pressure control line 50 and coupled to a single relief valve 60 and a drain hole through the pressure control line 50.

Accordingly, when a difference between an oil pressure of the control gallery 40 and a pressure in the drain hole of the relief valve 60 is greater than spring force of the relief valve 60, the relief valve 60 opens so that oil is drained through the drain hole, whereby the pressure difference between the control gallery 40 and the drain hole can be maintained at a low pressure.

Thus, when the control gallery 40 opens, a predetermined oil pressure can be immediately formed.

The OCV is disposed between the main gallery 30 and the control gallery 40. As shown in FIG. 5, if electricity is applied to a solenoid 5 when the OCV is turned on, a pintle 6 pushes a check ball 7 to open a flow passage defined by the main gallery 30 and the control gallery 40 and, simultaneously, the pintle 6 blocks the pressure control line 50 to close a flow passage defined by the control gallery 40 and the pressure control line 50, thus preventing oil from leaking from the control gallery 40.

As shown in FIG. 6, when the OCV is turned off, the pintle 6 returns to its original position, and the check ball 7 moves upward so that the flow passage of the main gallery 30 and the controller gallery 40 is blocked.

Simultaneously, the control gallery 40 is coupled with the pressure control line 50 by opening a hole connected to the pressure control line 50.

Consequently, the hydraulic pressure of the pressure control line 50 is maintained constant by the spring of the relief valve 60.

The orifice 70 is disposed on a return line coupled between the main gallery 30 and the pressure control line 50, and is configured to supply oil so that the control gallery 40 can be always filled with oil.

The relief valve 60 is configured to maintain the pressure difference between the control gallery 40 and a drain line connected to the drain hole constant when the OCV is turned off.

When the pressure difference is greater than the mounting load of a relief spring, the relief valve opens, and when it is less than the mounting load, the relief valve is closed.

In an exemplary embodiment of the present invention having the above-mentioned configuration, in the case where a plurality of variable valve apparatuses are applied to a single engine, the efficiency of the control system and the OCV can be further enhanced. The operating mode of the engine is changed depending on a method in which the variable valve apparatuses are disposed in the engine. With regard to this, examples of various engine control modes are shown in Table 1.

TABLE 1

| | Details of function | | | Cyl. #1 | Cyl. #2 | Cyl. #3 | Cyl. #4 |
|---|---|---|---|---|---|---|---|
| Mode 1 | 4-cylinder combustion with Intake lift 1, Exhaust lift 1 | Combustion status | | o | o | o | o |
| Mode 1 | 4-cylinder combustion with Intake lift 1, Exhaust lift 1 | Intake | Valve lift | In_Lift_1 | In_Lift_1 | In_Lift_1 | In_Lift_1 |
| Mode 1 | 4-cylinder combustion with Intake lift 1, Exhaust lift 1 | Exhaust | Valve lift | Ex_Lift_1 | Ex_Lift_1 | Ex_Lift_1 | Ex_Lift_1 |
| Mode 2 | 2-cylinder combustion with Intake lift 1, Exhaust lift 1 2-cylinder CDA: Intake lift 0, Exhaust lift 0 | Combustion status | | o | x | x | o |
| Mode 2 | 2-cylinder combustion with Intake lift 1, Exhaust lift 1 2-cylinder CDA: Intake lift 0, Exhaust lift 0 | Intake | Valve lift | In_Lift_1 | Zero | Zero | In_Lift_1 |
| Mode 2 | 2-cylinder combustion with Intake lift 1, Exhaust lift 1 2-cylinder CDA: Intake lift 0, Exhaust lift 0 | Exhaust | Valve lift | Ex_Lift_1 | Zero | Zero | Ex_Lift_1 |
| Mode 3 | 4-cylinder combustion with Intake lift 2, Exhaust lift 1 | Combustion status | | o | o | o | o |
| Mode 3 | 4-cylinder combustion with Intake lift 2, Exhaust lift 1 | Intake | Valve lift | In_Lift_2 | In_Lift_2 | In_Lift_2 | In_Lift_2 |
| Mode 3 | 4-cylinder combustion with Intake lift 2, Exhaust lift 1 | Exhaust | Valve lift | Ex_Lift_1 | Ex_Lift_1 | Ex_Lift_1 | Ex_Lift_1 |
| Mode 4 | 2-cylinder combustion with Intake lift 2, Exhaust lift 1 2-cylinder CDA: Intake lift 0, Exhaust lift 0 | Combustion status | | o | x | x | o |
| Mode 4 | 2-cylinder combustion with Intake lift 2, Exhaust lift 1 2-cylinder CDA: Intake lift 0, Exhaust lift 0 | Intake | Valve lift | In_Lift_2 | Zero | Zero | In_Lift_2 |
| Mode 4 | 2-cylinder combustion with Intake lift 2, Exhaust lift 1 2-cylinder CDA: Intake lift 0, Exhaust lift 0 | Exhaust | Valve lift | Ex_Lift_1 | Zero | Zero | Ex_Lift_1 |
| Mode 5 | 4-cylinder CDA: Intake lift 0, Exhaust lift 0 | Combustion status | | x | x | x | x |
| Mode 5 | 4-cylinder CDA: Intake lift 0, Exhaust lift 0 | Intake | Valve lift | Zero | Zero | Zero | Zero |
| Mode 5 | 4-cylinder CDA: Intake lift 0, Exhaust lift 0 | Exhaust | Valve lift | Zero | Zero | Zero | Zero |

Here, o refers to "firing", and x refers to "not firing".

In the case of the conventional variable-valve engine using OCVs and a control circuit, if the number of control modes is increased like that shown in Table 1, the number of variable valve apparatuses and the number of OCVs are increased, and the control circuit is complicated.

Table 2 shows examples of the engine configuration depending on the variable-valve operating modes.

TABLE 2

| | Control mode | | Cyl. #1 | Cyl. #2 | Cyl. #3 | Cyl. #4 | Number of OCVs |
|---|---|---|---|---|---|---|---|
| Case 1 | Mode 1, 2 | Apparatus_Intake | 1 stage | 2 stages | 2 stages | 1 stage | 0 |
| Case 1 | Mode 1, 2 | Apparatus_Exhaust | 1 stage | 2 stages | 1 stage | 2 stages | 0 |
| Case 1 | Mode 1, 2 | Number of OCVs | 0 | 1 | 1 | 0 | Total: 2 |
| Case 2 | Mode 1, 2, 3, 4 | Apparatus_Intake | 2 stages | 3 stages | 3 stages | 2 stages | 2 |
| Case 2 | Mode 1, 2, 3, 4 | Apparatus_Exhaust | 1 stage | 2 stages | 2 stages | 1 stage | 0 |
| Case 2 | Mode 1, 2, 3, 4 | Number of OCVs | 0 | 1 | 1 | 0 | Total: 4 |
| Case 3 | Mode 1, 2, 3, 4, 5 | Apparatus_Intake | 3 stages | 3 stages | 3 stages | 3 stages | 2 |
| Case 3 | Mode 1, 2, 3, 4, 5 | Apparatus_Exhaust | 2 stages | 2 stages | 2 stages | 2 stages | 0 |
| Case 3 | Mode 1, 2, 3, 4, 5 | Number of OCVs | 1 | 1 | 1 | 1 | Total: 6 |
| Case 4 | Mode 1, 2, 5 | Apparatus_Intake | 2 stages | 2 stages | 2 stages | 2 stages | 0 |
| Case 4 | Mode 1, 2, 5 | Apparatus_Exhaust | 2 stages | 2 stages | 2 stages | 2 stages | 0 |
| Case 4 | Mode 1, 2, 5 | Number of OCVs | 1 | 1 | 1 | 1 | Total: 4 |

Examples of the configurations of the variable valve apparatus by cylinders in Case 2 are shown in Table 3.

TABLE 3

| Control mode | | Cyl. #1 | Cyl. #2 | Cyl. #3 | Cyl. #4 |
|---|---|---|---|---|---|
| Valve apparatus | Exhaust | Standard | 2-stage variable CDA | 2-stage variable CDA | Standard |
| | Intake | 2-stage variable VVL | 3-stage variation | 3-stage variation | 2-stage variable VVL |

Here, the configurations of the lift apparatus by valve apparatuses are as follows.

Figure 7A:
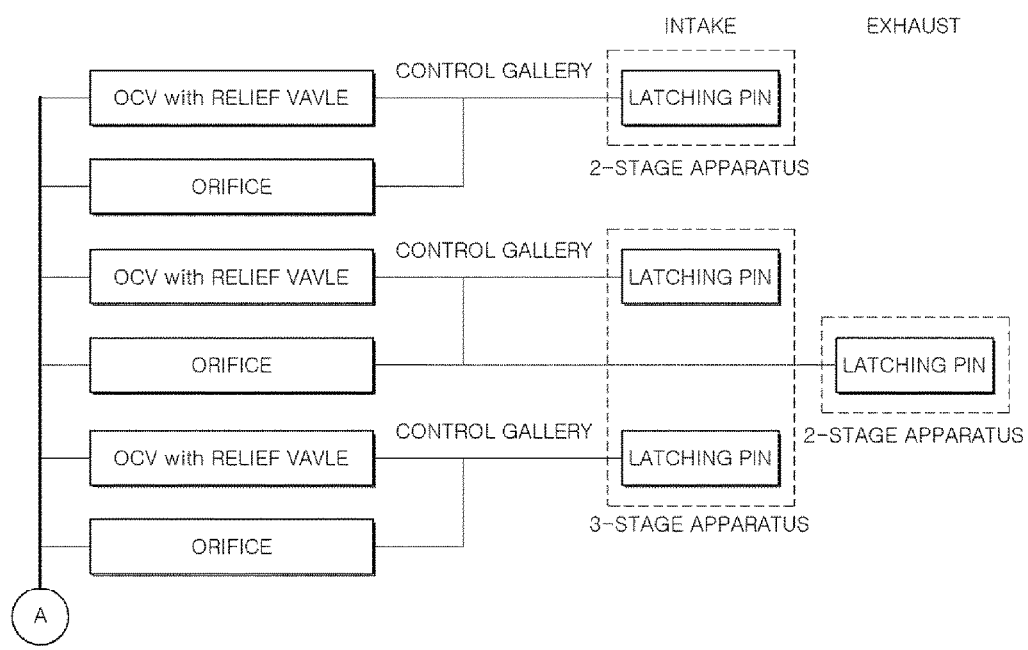
FIG. 7A, FIG. 7B and FIG. 9 are diagrams schematically illustrating the conventional oil circuit in a certain engine control mode.
Figure 7B:
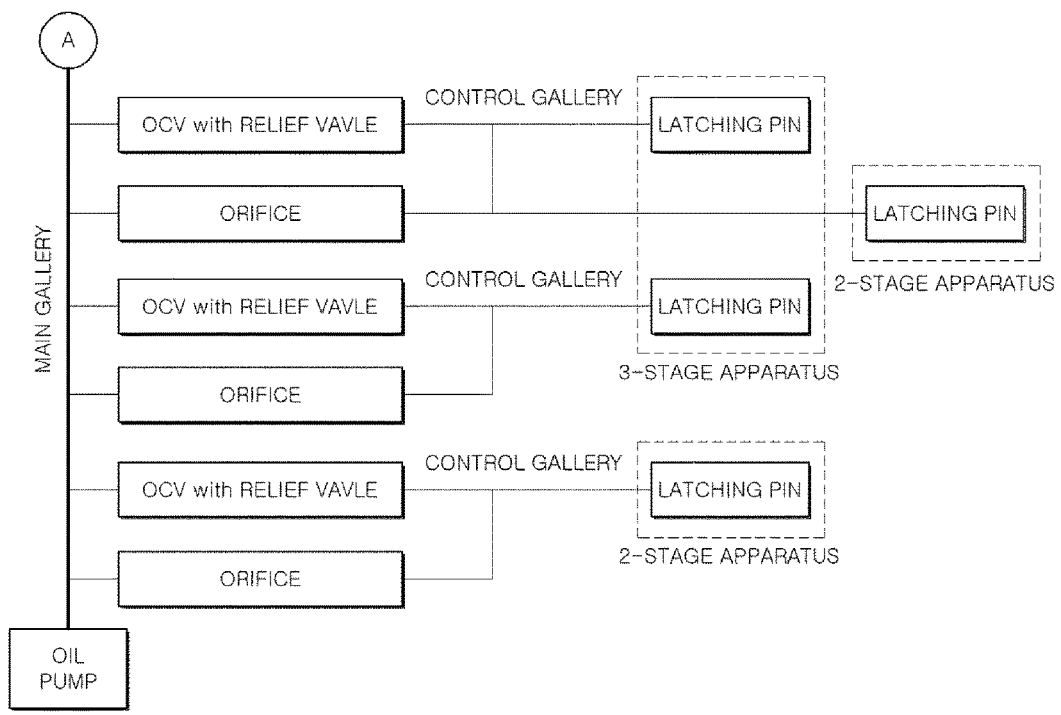
Figure 8:
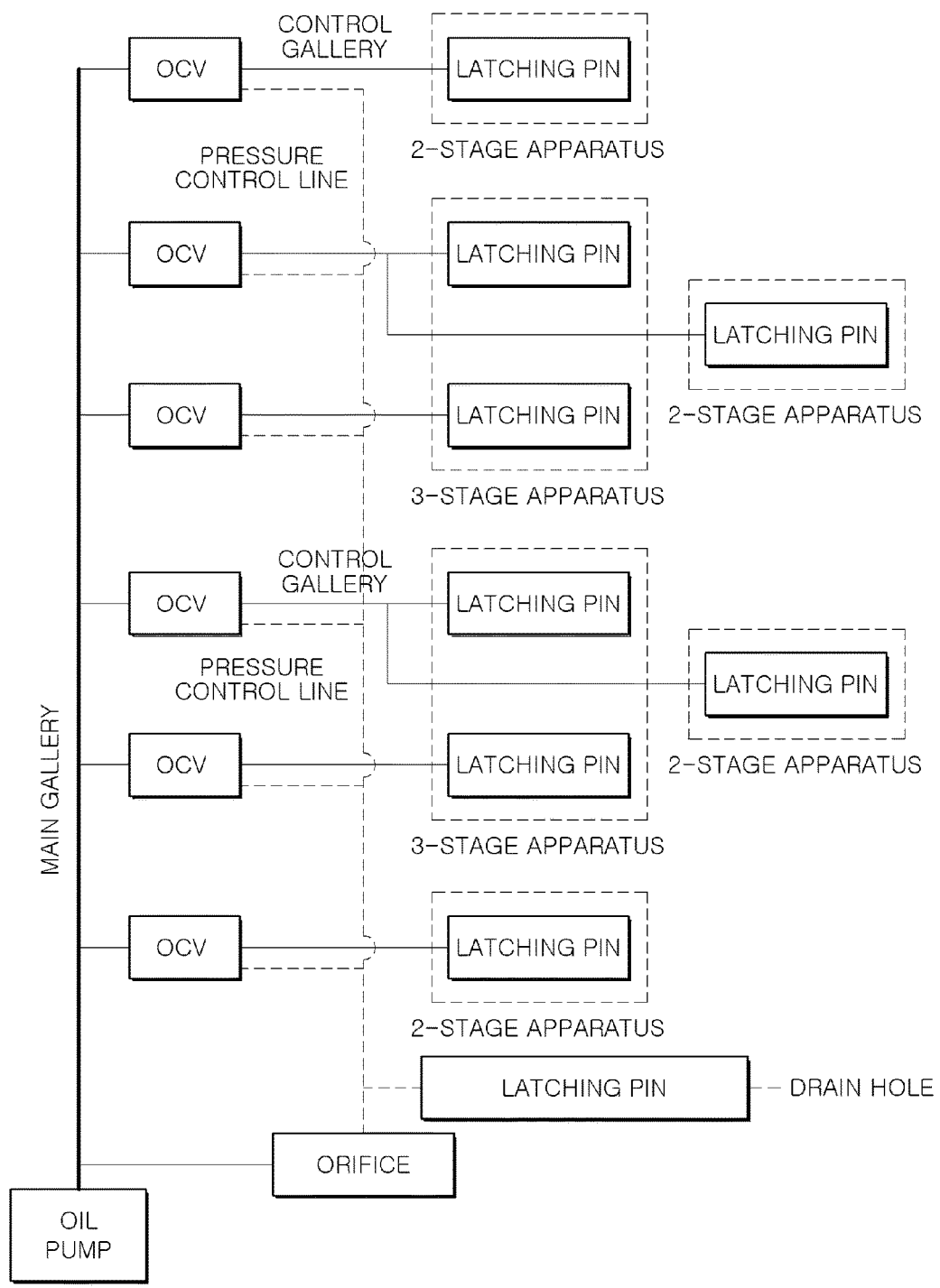
FIG. 8 and FIG. 10 are diagrams schematically illustrating the oil circuit according to an exemplary embodiment of the present invention in the engine control mode of FIG. 7A, FIG. 7B and FIG. 9.

Standard: normal, 2-stage variable CDA: 0 (no fire) or normal, 3-stage variable VVL: normal or Atkinson, 3-stage variation: 0 (no fire), normal, or Atkinson FIG. 7A and FIGS. 7B to 10 illustrate examples comparing the cases where the variable valve apparatus control system and the OCV according to an exemplary embodiment of the present invention are applied to an oil circuit, with other conventional cases. FIG. 7A and FIG. 7B illustrates the configuration of a conventional oil circuit when the engine control mode is Case 2. FIG. 8 illustrates the configuration of the oil circuit of the present invention when the engine control mode is Case 2.

Figure 9:
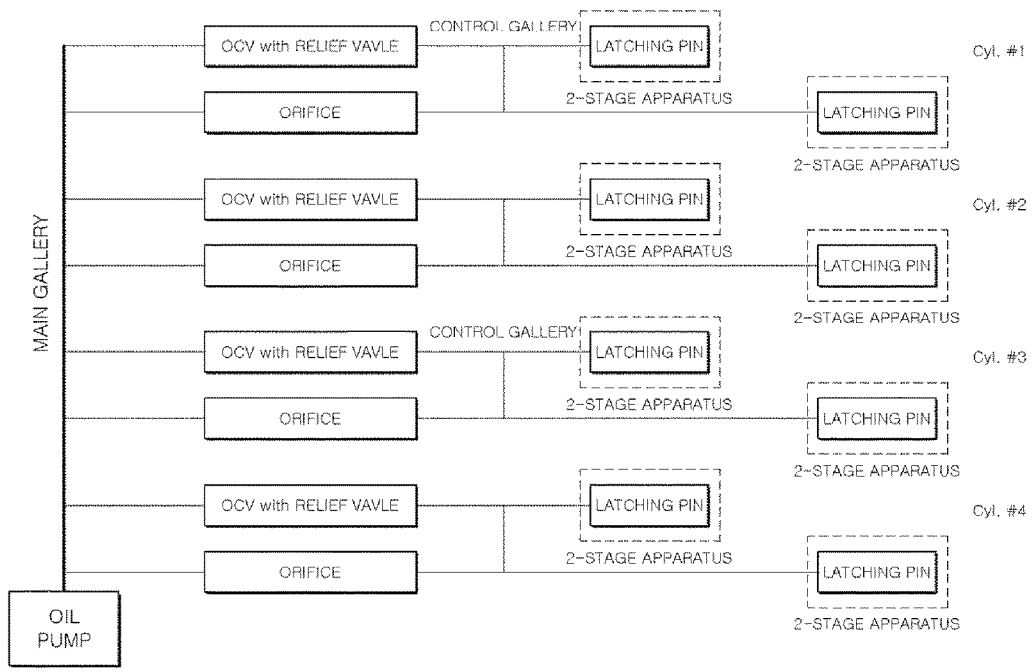
Figure 10:
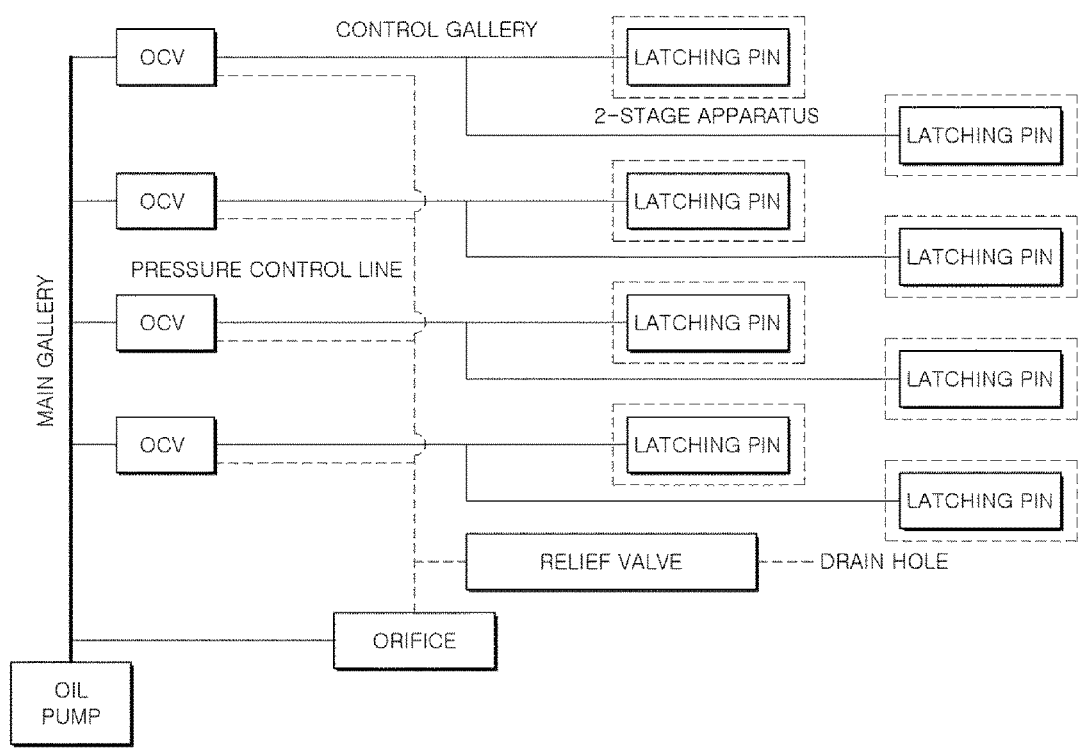

FIG. 9 illustrates the configuration of a conventional oil circuit when the engine control mode is entire-cylinder CDA. FIG. 10 illustrates the configuration of the oil circuit of the present invention when the engine control mode is entire-cylinder CDA Referring to the examples of FIG. 7A and FIGS. 7B to 10, it can be understood that there are notable differences in the number of relief valves and the number of orifices between the conventional case and the present invention. Therefore, in the OCV and the variable valve apparatus control system according to an exemplary embodiment of the present invention, even though a plurality of variable valve apparatuses are used in a single engine, the degree of freedom in design can be enhanced in terms of packaging or production cost.

Differences in the number of parts are shown in Table 4.

TABLE 4

| Control mode | | Parts | Conventional (EA) | Present invention (EA) |
|---|---|---|---|---|
| Case 1 | Mode 1, 2 | OCV | 2 | 2 |
| Case 1 | Mode 1, 2 | Relief valve | 2 | 1 |

TABLE 4-continued

| Control mode | | Parts | Conventional (EA) | Present invention (EA) |
|---|---|---|---|---|
| Case 1 | Mode 1, 2 | Orifice | 2 | 1 |
| Case 2 | Mode 1, 2, 3, 4 | OCV | 4 | 4 |
| Case 2 | Mode 1, 2, 3, 4 | Relief valve | 4 | 1 |
| Case 2 | Mode 1, 2, 3, 4 | Orifice | 4 | 1 |
| Case 3 | Mode 1, 2, 3, 4, 5 | OCV | 6 | 6 |
| Case 3 | Mode 1, 2, 3, 4, 5 | Relief valve | 6 | 1 |
| Case 3 | Mode 1, 2, 3, 4, 5 | Orifice | 6 | 1 |
| Case 4 | Mode 1, 2, 5 | OCV | 4 | 4 |
| Case 4 | Mode 1, 2, 5 | Relief valve | 4 | 1 |
| Case 4 | Mode 1, 2, 5 | Orifice | 4 | 1 |

As described above, in a system for controlling a variable valve apparatus and an oil control valve for the system according to an exemplary embodiment of the present invention, the numbers of orifices and relief valves can be reduced compared to those of the conventional technique. Therefore, even if different types of variable valve apparatuses are applied to a single engine, a problem of difficulty in packaging and a problem of an increase in the production cost can be prevented.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a variable valve apparatus, comprising:
a plurality of oil control valves (OCVs) configured to respectively supply oil from an oil pump to a plurality of variable valve apparatuses or block the supply of the oil; and
a single relief valve coupled to the plurality of oil control valves,
wherein pressure in a plurality of control galleries fir providing an oil supply path from the plurality of oil control valves to the plurality of variable valve apparatuses is maintained constant by only the single relief valve,
wherein the plurality of oil control valves is coupled with the single relief valve through a pressure control line, and when the supply of oil to the plurality of variable valve apparatuses is blocked, the plurality of control galleries is coupled with the pressure control line.

2. The system of claim 1, wherein a drain hole for draining oil is formed in the single relief valve so that the pressure in the plurality of control galleries is reduced by draining oil from the plurality of control galleries through the drain hole, so that a difference in pressure between the plurality of control galleries and the drain hole remains constant.

3. The system of claim 2, wherein, when the difference in pressure between the plurality of control galleries and the drain hole is greater than a spring force of the single relief valve, the single relief valve opens so that oil is drained through the drain hole.

4. The system of claim 3, wherein, when a first flow passage from the plurality of control galleries to the plurality of variable valve apparatuses is opened by solenoid control, a second flow passage from the plurality of oil control valves to the pressure control line is blocked.

5. The system of claim 4, wherein, when the supply of oil from the oil pump to the plurality of oil control valves is blocked by solenoid control, the first flow passage is blocked.

6. The system of claim 5, wherein the plurality of variable valve apparatuses includes a 2-stage variable valve apparatus or a 3-stage variable valve apparatus.

7. The system of claim 3, further including a single orifice provided on a return line coupling the pressure control line with a main gallery for providing a path of oil to be supplied from the oil pump to the plurality of oil control valves, so that the plurality of control galleries continues to be filled with oil by only the single orifice.

8. A system for controlling a variable valve apparatus, including:
a plurality of oil control valves (OCVs) configured to respectively supply oil supplied from an oil pump through a main gallery, to a plurality of variable valve apparatuses through a plurality of control galleries, or block the supply of the oil; and
a pressure control line coupled with the plurality of oil control valves and configured to control pressure in the plurality of control galleries; and
a single orifice provided on a return line coupling the main gallery with the pressure control line, so that the plurality of control galleries continues to be filled with oil by only the single orifice,
wherein, when the supply of the oil to the plurality of variable valve apparatuses blocked by the plurality of oil control valves, the plurality of control galleries is coupled with the pressure control line.

9. The system of claim 8, wherein the pressure in the plurality of control galleries is reduced by draining oil from the plurality of control galleries through the pressure control line.

10. The system of claim 9, wherein, when a first flow passage from the plurality of control galleries to the plurality of variable valve apparatuses is opened by solenoid control, a second flow passage from the plurality of oil control valves to the pressure control line is blocked.

11. The system of claim 10, wherein, when the main gallery is blocked by solenoid control, the first flow passage is blocked.

12. The system of claim 11, wherein the plurality of variable valve apparatuses includes a 2-stage variable valve apparatus or a 3-stage variable valve apparatus.

13. An oil control valve configured to supply oil from an oil pump to a variable valve apparatus through a control gallery or block the supply of the oil, wherein pressure of oil in the control gallery is configured to be controlled through a pressure control line coupled with a relief valve separately provided,
wherein, when a pintle operates a check ball by a solenoid to block a first flow passage from the control gallery to the variable valve apparatus, a hole coupled to the pressure control line opens so that the check ball is disposed at a position at which a second flow passage between the control gallery and the pressure control line opens.

14. The oil control valve of claim 13, wherein, when the second flow passage opens, oil in the control gallery is drained through the pressure control line so that the pressure of the oil in the control gallery is reduced.

15. The oil control valve of claim 14, wherein, when a difference in pressure between the control gallery and the pressure control line is a predetermined value or more, the oil in the control gallery is drained through the pressure control line.

16. The oil control valve of claim 15, wherein, when the pintle operates the check ball by the solenoid to open the first flow passage, the check ball is disposed at a position at which the check ball closes the hole coupled to the pressure control line so that the second flow passage is blocked.

17. The oil control valve of claim 16, wherein, when the pintle operates the check ball by the solenoid and thus the supply of the oil from the oil pump is blocked, the check hall is disposed at a position at which the first flow passage is blocked.

* * * * *